Feb. 13, 1940. T. F. PEARSON 2,190,042
APPARATUS FOR THE MANUFACTURE OF GLASSWARE
Filed Jan. 11, 1937 3 Sheets-Sheet 3
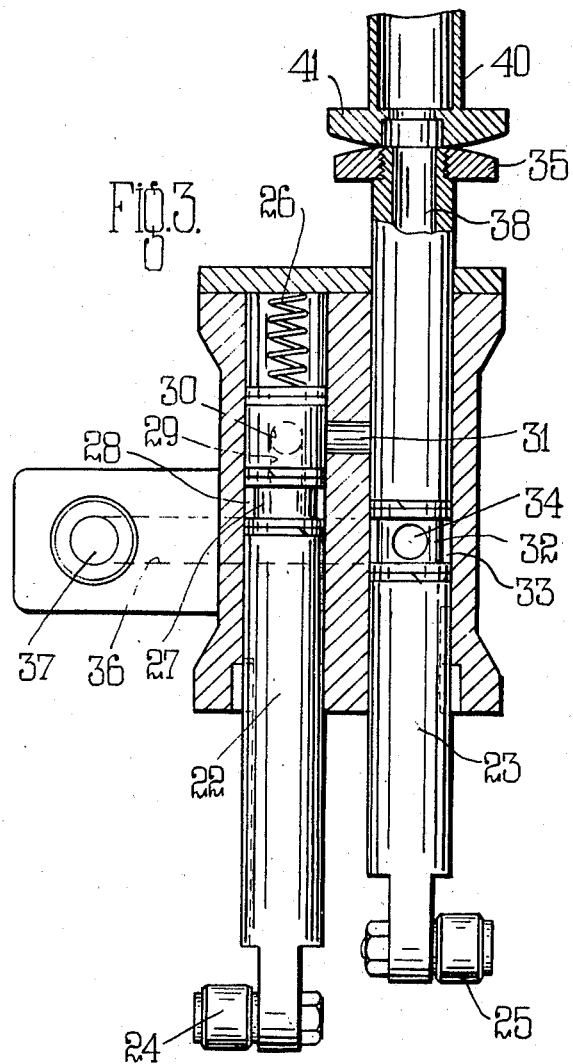
Inventor,
Thomas Finney Pearson,
John J. V. Armstrong.
Attorneys.

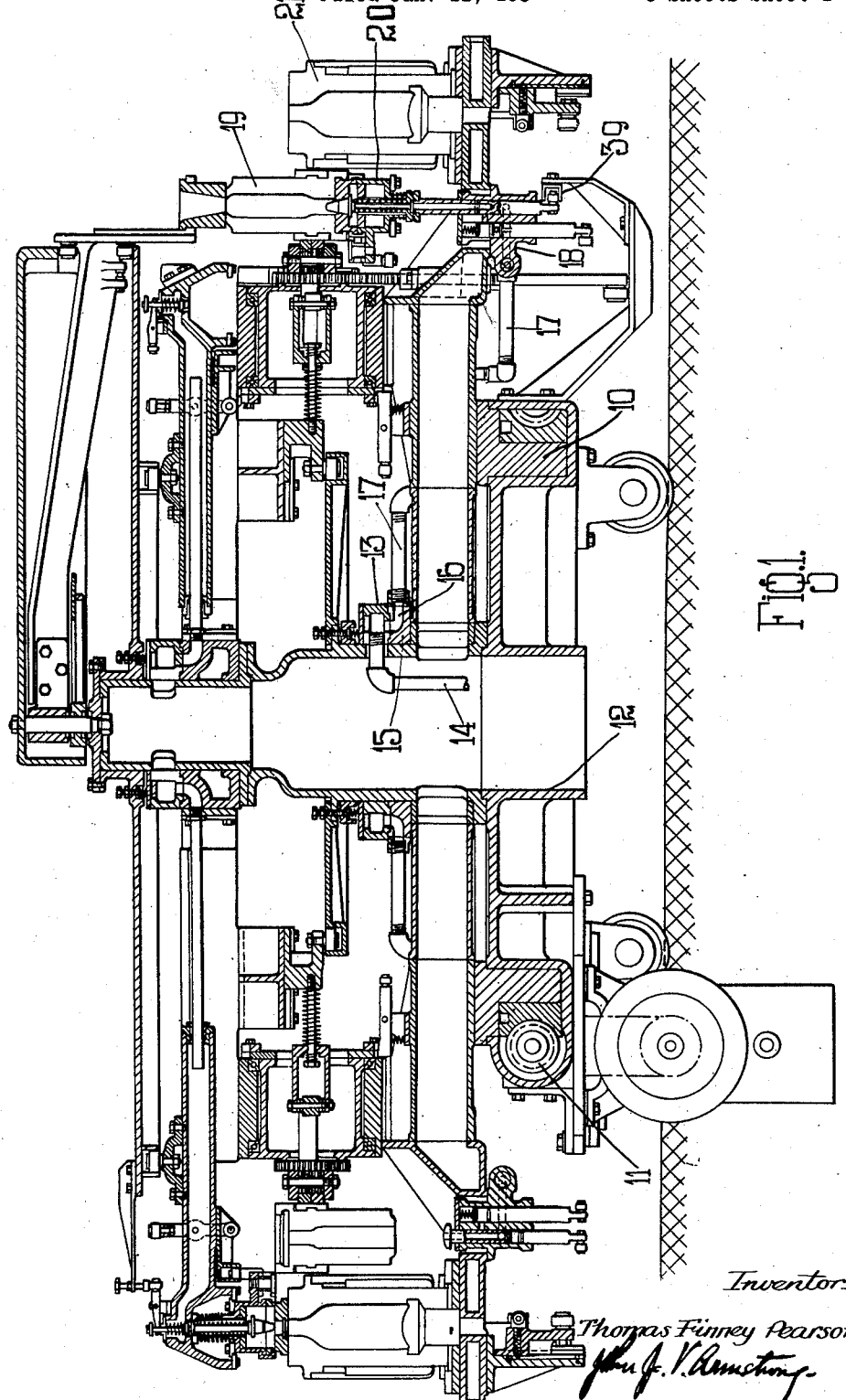

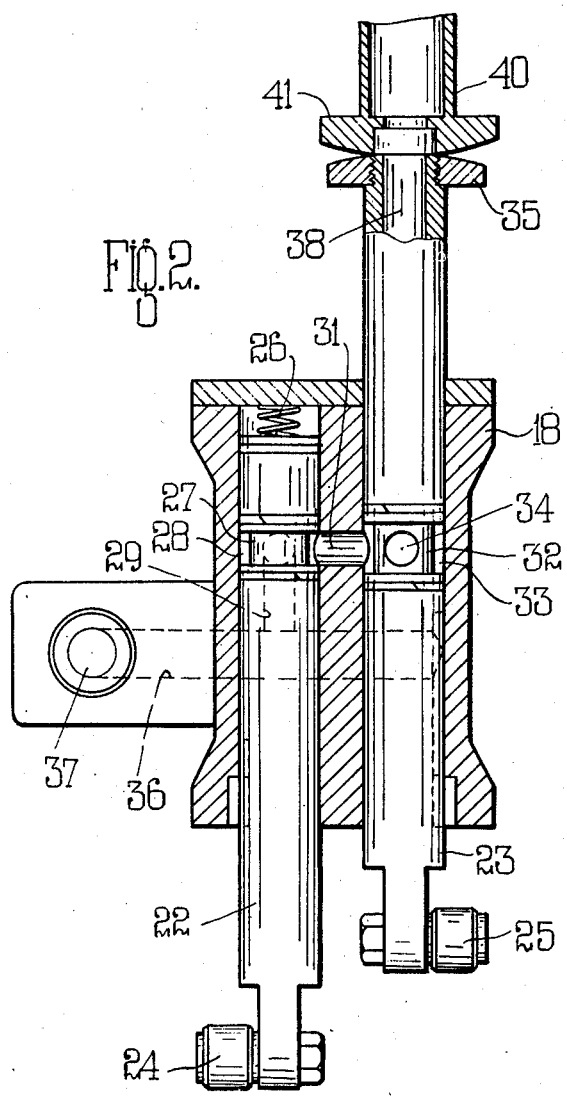

Patented Feb. 13, 1940

2,190,042

UNITED STATES PATENT OFFICE 2,190,042

APPARATUS FOR THE MANUFACTURE OF GLASSWARE

Thomas Finney Pearson, Pontefract, England, assignor to Crown Cork & Seal Company, Inc., New York, N. Y., a corporation of New York Application January 11, 1937, Serial No. 120,076
In Great Britain January 22, 1936

7 Claims. (Cl. 49—9)

The present invention relates to the manufacture of glassware and has for its object the provision of efficient means for ensuring the application of vacuum, the application of blowing air supply and the cutting off of both vacuum and blowing air supply at the required periods during the production of hollow glassware such as bottles, jars or the like within moulds.

The invention is particularly applicable to a rotary machine wherein one or more moulds are moved with a rotary table in a circumferential path about the axis of the table and wherein one or more valves for controlling the application of vacuum, the supply of compressed air and the cutting off of both vacuum and compressed air are associated with the table to rotate with the moulds.

According to the present invention vacuum and a blowing air pressure are applied in succession to a blow head of a parison or other mould from a distribution box member, common to both the vacuum and the pressure supply, through a conduit to a pair of valves each independently controllable whereby the period of time during the application of vacuum or the application of pressure or again the interval between the two may be varied as desired.

The invention is more particularly described with reference to the accompanying drawings, in which:

Figure 1 is a view in elevation, partly in section of a suitable arrangement of forming machine to which the invention is particularly applicable.

Figure 2 is a vertical sectional view of the valves in that position in which vacuum is applied to a mould for forming the neck of the bottle, jar or the like hollow glassware.

Figure 3 is a view similar to Fig. 2 but with the valves in the position consistent with the application of pressure to the mould associated therewith.

In the construction according to the drawings and with particular reference to Figure 1 the parts of which are specifically referred to in my co-pending application No. 111,517 filed on November 18, 1936, a table 10 through the action of a worm 11 is rotatable about a central hollow pillar 12 on which a distribution box member 13 is rigidly mounted, said distribution box member having an inlet from a pipe 14 in communication with means for establishing a vacuum and another inlet (not shown) in communication with a source of compressed air supply. The box member accordingly is divided into two compartments each having an exhaust port in its lower face, the ports being in registry with an annulus 15 adapted for rotation with the table 10. The annulus has a number of elbow conduits 16 each extending from its upper radial face adapted for sliding engagement with the base of the stationary distribution box member 13 and its outer periphery at which points they are connected with conduits 17 extending substantially radially of the table to valve casings 18 carried by the table and disposed in circumferentially spaced relationship thereon.

From this it follows that as the table rotates about the hollow axis 12 vacuum may be established in the conduits 17 in succession and when each elbow conduit 16 in the rotary annulus 15 passes from beneath the part in the vacuum compartment of the box 13 to the part in the compartment of the box which is in communication with the supply of compressed air a charge of compressed air is fed to each conduit 17 in turn.

A series of parison moulds 19 are also associated with the table for rotation therewith and during said rotation each parison mould in turn is adapted for inversion with its co-operating blow head 20 as described in my co-pending application No. 111,517 in order to take up a position in which a vacuum may be applied for forming the neck of the parison within a mould 19 and in which compressed air may be supplied subsequently for partially blowing the parison prior to its transfer to a co-operating blow mould 21 as pointed out in my copending application Serial No. 111,517, a similar number of blow moulds is provided, one corresponding to each parison mould.

Turning to Figures 2 and 3 it will be observed that each unitary valve casing 18 has two parallel bores, adapted to receive valves in the form of longitudinally displaceable plungers 22, 23. The plunger 22 at its lower end carries a roller 24 while the plunger 23 similarly carries a roller 25. The plunger 22 is displaceable upwardly against a spring 26 and has an intermediate portion 27 of relatively narrow diameter to form an annular compartment 28 between it and the wall of the bore in which the plunger 22 is reciprocable. The casing also has a longitudinal conduit 29 formed therein and a lateral port 30 which in one position of displacement of the plunger 22 is adapted for registration with the annular compartment 28, which in that position communicates with a port 31 in the casing so as to establish communication between the two bores in which the plungers 22 and 23 are disposed.

The other plunger 23 similarly has an intermediate portion 32 of relatively narrow diameter which forms the inner bounding wall of an annular chamber 33 between the reduced portion 32 and the wall in which the bore of the plunger 23 is disposed. A port 34 communicates between this portion 32 and a longitudinal bore 38 extending axially and upwardly in the plunger 23 to its top 35. Each valve casing 18 also has a horizontal conduit 36 formed therein with a port 37 at its inner end, to which is connected the outer end of one of the conduits 17. The conduit 36 at its outer end is in communication with the bore in which the plunger 23 is disposed. The plungers 22 and 23 are prevented from dropping out of the casing 18 by means of keys carried by the casing and disposed in vertical keyways or slots in the plungers, as indicated in Figures 2 and 3.

The roller 24 of the plunger type of valve 22 is adapted for engagement with a cam track, not shown, for the purpose of lifting the plunger from the position shown in Figure 3 to that shown in Figure 2, that is to say, to enable the plunger 22 to permit of the application of vacuum to the bore 31. The roller 25 of each plunger 23 is adapted for engagement with a cam track 39 which has two steps and three levels formed thereon so that during travel of each roller 25 along the cam track 39 the plunger takes up three positions within its casing 18. In the lowermost position of each plunger 23 that annular groove 32 with its port 34 lies below the conduit 36 of the casing 18 so that neither vacuum nor compressed air can be supplied through the bore 38 of the plunger 23. In the intermediate position of the plunger 23, as shown in Figure 3, the port 34 lies in the plane of the conduit 36 so as to receive a supply of compressed air direct from its conduit 17 without hindrance by the plunger 22.

In the third and upper position of the plunger 23 (Figure 2) governed by the cam track 39, the transverse bore 31 between the plunger bores is in communication with the annular groove 33 of the plunger 23, and in this position, the plunger 22 is also elevated to establish communication between the bore 31, the annular recesses 28 and 33, the port 30, and the conduits 29, 36 and 17, permitting vacuum to be established in the bore 38 of the plunger 23. Both on the establishment of vacuum and the supply of compressed air to the bore 38, a plunger 40 of an inverted blow head 20 associated with an inverted parison lies co-axial with said bore and with the end 41 of the plunger positively held against the top 35 of the plunger 23.

In operation and during rotation of the table each parison mould 19 with its cooperating blow head 20 is inverted in order to receive a charge of glass, whereupon the plunger 22 of the valve casing associated with such parison mould 19 is elevated by the action of a cam (not shown) on its roller 24 to bring the annulus 28 into line with the transverse bore 31. Meanwhile, the plunger 23 has also been elevated by the action of the cam track 39 on its roller 25 to bring the annulus 33 into registration with the transverse bore 31. By the time this position of the plungers is reached (Fig. 2) the elbow conduit 16 of the conduit 17 associated with this unitary structure 18 passes across the exit port of the compartment in the distribution box member 13 which is in communication with the pipe 14 from the vacuum establishing means. Accordingly vacuum is applied to the bore 38 of the plunger 23 and through the bore of the plunger 40 to form the neck of the parison within the parison mould 19. By moving the plunger 22 longitudinally of its bore, the commencement, duration and termination of the application of vacuum can be controlled, independently of movements of the plunger 23 and thus independently of movements of certain parts controlled thereby, such as the mouth forming pin or plunger and its hollow stem, associated with the blow head 20. The specific structure of the mouth forming pin and its hollow stem is disclosed in my co-pending application Serial No. 100,944.

During further rotation of the parison mould, the valve casing 18 and the conduit 17 about the pillar 12, the roller 24 of the plunger 22 is freed from contact with its cam track whereby the plunger 22 descends under the action of the spring 26. At the same time, or subsequently, the plunger 23 engages with a lower stepped portion of the cam track 39 and descends to the position shown in Figure 3.

By the time this position has been reached the elbow conduit 16 of the rotary annulus 15 is in communication with an exit port of the compartment in the distribution box 13 which in turn is in communication with the compressed air supply, so that compressed air is delivered through the conduit 17 and thence directly through the conduit 36, annular chamber 33, port 34 and the bore 38 to partially blow the parison within the parison mould 19. On further movement of the rotary elements about the stationary pillar 12, the plunger 23 is allowed to descend further, thereby cutting off the bore 38 from communication with both the vacuum passage 31 and the compressed air passage 36, thereby freeing the top 35 of the plunger 23 from contact with the plunger 40 and thus permitting the parison mould 19 and its associated blow head 20 and the plunger 40 to be inverted and the parison to be moved radially outwards to a position in which it can be picked up by a blow mould 21 for the completion of the blowing operation as is described in my co-pending application No. 111,517.

I declare that what I claim is:

1. A valve assembly for controlling the application of suction and of blowing air to a blow head associated with the neck and of a parison mould, said blow head comprising a neck forming pin, movably mounted thereon to assume different positions during suction compacting and blowing of a blank, and a hollow longitudinally movable stem carrying said pin said valve assembly comprising a casing having a bore therein, a suction passage and a blowing air passage leading to said bore at longitudinally spaced points, a reciprocable hollow valve plunger in said bore having a peripheral port registrable alternately with said passages, and having an open end positioned to register with the end of said hollow blow head stem, means for moving the plunger and the stem longitudinally to cause the stem to assume said different positions and said peripheral port to register alternately with said passages, and a supplemental valve in the suction passage to control the flow of fluid therethrough, independently of movements of the hollow valve plunger and of the hollow stem.

2. A valve assembly for controlling the application of suction and of blowing air to a blow head associated with the neck end of a parison mould, said blow head comprising a neck forming pin, movably mounted therein to assume different positions during suction compacting and blowing of a blank, and a hollow longitudinally movable stem carrying said pin, said valve assembly comprising a casing having a bore therein, a suction passage and a blowing air passage leading to said bore at longitudinally spaced points, a reciprocable hollow valve plunger in said bore having a peripheral port registrable alternately with said passages, and having an open end positioned to register with the end of said hollow blow head stem, means for moving the plunger and the stem longitudinally to cause the stem to assume said different positions and said peripheral port to register alternately with said passages, and a second reciprocable plunger, and means for moving the same to close the suction passage to terminate the flow of fluid therethrough, independently of movements of the hollow valve plunger and of the hollow stem.

3. In a glassware forming machine of the type wherein a mould table is rotatable about a stationary central column, a parison mould and a blow head are mounted on the table, and stationary vacuum and positive air pressure chambers are mounted on the column, means for controlling the application of suction and of blowing air to said blow head from said chambers, said means comprising a single air line mounted on the table and having an end positioned to register successively with the vacuum chamber and with the positive air pressure chamber during the rotation of the table, and valve means in said line, said valve means comprising a casing having a bore therein and two air passages leading from said line and communicating with said bore at longitudinally spaced points, a reciprocable plunger in said bore having a lateral port registrable alternately with said air passages upon movement of the plunger, said valve means also comprising surfaces defining an orifice communicating with said bore and registering with said blow head and thereby establishing communication between the blow head and said bore, a supplemental valve in one of said air passages, and means for operating said valve to control the flow of fluid through the last-mentioned passage and said bore independently of movement of the first-mentioned plunger.

4. In a glassware forming machine of the type wherein a mould table is rotatable about a stationary central column, a parison mould and a blow head are mounted on the table, and stationary vacuum and positive air pressure chambers are mounted on the column, means for controlling the application of suction and of blowing air to said blow head from said chambers, said means comprising a single air line mounted on the table and having an end positioned to register successively with the vacuum chamber and with the positive air pressure chamber during the rotation of the table, and valve means in said line, said valve means comprising a valve casing having a bore therein and two air passages leading from said line and communicating with said bore at longitudinally spaced points, a reciprocable hollow valve plunger in said bore having a peripheral port registrable alternately with said air passages upon reciprocation of the plunger, said plunger having an open end registering with said blow head and establishing communication between the latter and said air passages, a supplemental valve in one of said air passages, and means for operating said valve to control the flow of fluid through the hollow plunger, said bore, and said one air passage, independently of movements of said hollow plunger.

5. In a glassware forming machine of the type wherein a mould table is rotatable about a stationary central column, a parison mould and a blow head are mounted on the table, and stationary vacuum and positive air pressure chambers are mounted on the column, means for controlling the application of suction and of blowing air to said blow head from said chambers, said means comprising a single air line mounted on the table and having an end positioned to register successively with the vacuum chamber and with the positive air pressure chamber during the rotation of the table, and valve means in said line, said valve means comprising a casing having two bores therein and two air passages leading from said line and communicating with one of said bores at longitudinally spaced points, a reciprocable hollow valve plunger in the last-mentioned bore having a peripheral port registrable alternately with said air passages upon reciprocation of the plunger, said plunger having another port registering with the blow head and establishing communication between the blow head and said peripheral port, the other of said bores traversing one of the air passages leading to the first bore, a valve plunger in the last-mentioned bore, and means for reciprocating the last-mentioned plunger to control the flow of fluid through the associated passage and the first-mentioned bore, independently of the movement of said hollow valve plunger.

6. In a glassware forming machine of the type wherein a mould table is rotatable about a stationary central column, a parison mould and a blow head are mounted on the table, and stationary vacuum and positive air pressure chambers are mounted on the column, means for controlling the application of suction and of blowing air to said blow head from said chambers, said means comprising a single air line mounted on the table and having an end positioned to register successively with the vacuum chamber and with the positive air pressure chamber during the rotation of the table, and valve means in said line, said valve means comprising a valve casing having a bore therein and two air passages leading from said line and communicating with said bore at longitudinally spaced points, a reciprocable hollow valve plunger in said bore having a peripheral port registrable alternately with said air passages upon reciprocation of the plunger, said plunger having an open end registering with said blow head, means for reciprocating the plunger in its bore, said means comprising a stationary cam and a roller carried by the plunger for travel along the cam during the rotation of the mould table; a supplemental valve in one of said air passages, and means to operate said valve to control the flow of fluid therethrough and through said bore, independently of the reciprocating movements of said hollow valve plunger.

7. In a glassware forming machine of the type wherein a mould table is rotatable about a stationary central column, a parison mould and a blow head are mounted on the table, and stationary vacuum and positive air pressure chambers are mounted on the column, means for controlling the application of suction and of blowing air to said blow head from said chambers, said means comprising a single air line mounted on the table and having an end positioned to register successively with the vacuum chamber and with the positive air pressure chamber during the rotation of the table, and valve means in said line, said valve means comprising a casing having passages leading from said line and forming two paths, one for the flow of air from the mould to produce suction therein and the other for a flow of blowing air to the mould, and a pair of reciprocable valve plungers in the casing, one traversing both of said paths and the other traversing only one, the first plunger having a port movable into each of said paths alternately to establish a flow of air through the port and the adjacent path from and to the mould respectively, the other plunger having a port movable into and out of said one path only, to control the flow of air from the mould through that path and through the port of the first plunger, the first-mentioned plunger alone controlling the flow of blowing air through the other path by movement of the port therein into and out of the last-mentioned path.

THOMAS FINNEY PEARSON.